(12) United States Patent
Itakura et al.

(10) Patent No.: US 10,359,201 B2
(45) Date of Patent: Jul. 23, 2019

(54) HEAT EXCHANGER AND REFRIGERATION CYCLE DEVICE

(71) Applicant: FUJITSU GENERAL LIMITED, Kanagawa (JP)

(72) Inventors: Shunji Itakura, Kanagawa (JP); Ken Horiguchi, Kanagawa (JP); Toshiyuki Fuji, Kanagawa (JP); Sota Shimada, Kanagawa (JP); Kazuya Funada, Kanagawa (JP); Kenji Komine, Kanagawa (JP); Junya Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 15/882,209

(22) Filed: Jan. 29, 2018

(65) Prior Publication Data

US 2018/0216837 A1  Aug. 2, 2018

(30) Foreign Application Priority Data

Jan. 30, 2017  (JP) .................................. 2017-014509

(51) Int. Cl.
*F25B 9/00* (2006.01)
*F28F 13/18* (2006.01)
(Continued)

(52) U.S. Cl.
CPC ................. *F24F 1/26* (2013.01); *F24F 1/14* (2013.01); *F25B 9/002* (2013.01); *F25B 39/04* (2013.01);
(Continued)

(58) Field of Classification Search
CPC ........ F28F 13/187; F28F 1/40; F28F 2210/06; F25B 9/002
See application file for complete search history.

(56) References Cited

U.S. PATENT DOCUMENTS

2014/0070132 A1    3/2014  Fukushima

FOREIGN PATENT DOCUMENTS

JP           2005-195192 A        7/2005
JP           2005-195192    *     7/2008   ................ F28F 1/40
(Continued)

OTHER PUBLICATIONS

English machine translation of JP 2005-195192 translated Nov. 25, 2018, Pages All. (Year: 2005).*

(Continued)

*Primary Examiner* — Cassey D Bauer
(74) *Attorney, Agent, or Firm* — Paratus Law Group, PLLC

(57) ABSTRACT

A heat exchanger includes: a heat transfer pipe in which refrigerant flows; and a spiral groove formed at an inner peripheral surface of the heat transfer pipe. A height of an inner wall of the groove in a radial direction of the heat transfer pipe is equal to or greater than 0.1 [mm], and when a wetted edge length of the heat transfer pipe is S, an inclination angle between a pipe axis direction of the heat transfer pipe and a longitudinal direction of the groove in a section of the heat transfer pipe parallel with the pipe axis direction is θ, and a length of the heat transfer pipe is L, the inclination angle θ is an acute angle, and a wetted area S×L/cos θ of the heat transfer pipe satisfies S×L/cos θ≥0.5 [m2].

2 Claims, 4 Drawing Sheets

(51) Int. Cl.
  *F24F 1/26*  (2011.01)
  *F24F 1/14*  (2011.01)
  *F25B 39/04*  (2006.01)
  *F28D 7/08*  (2006.01)
  *F28F 1/40*  (2006.01)
  *C09K 5/04*  (2006.01)

(52) U.S. Cl.
  CPC ............... *F28D 7/082* (2013.01); *F28F 1/40* (2013.01); *F28F 13/187* (2013.01); *C09K 5/045* (2013.01); *F28F 2210/06* (2013.01)

(56) References Cited

FOREIGN PATENT DOCUMENTS

KR  20-2009-0006120 U  6/2009
WO  WO 2012/157764 A1  11/2012

OTHER PUBLICATIONS

Jun. 21, 2018, European Search Report issued for related EP Application No. 18154267.1.

\* cited by examiner

HEAT EXCHANGER AND REFRIGERATION CYCLE DEVICE

CROSS-REFERENCE TO RELATED APPLICATION

This application claims priority from Japanese Patent Application No. 2017-014509 filed with the Japan Patent Office on Jan. 30, 2017, the entire content of which is hereby incorporated by reference.

FIELD

The present disclosure relates to a heat exchanger and a refrigeration cycle device.

BACKGROUND

A refrigeration cycle device includes a compressor, a condenser, an expansion valve (a decompressor), and an evaporator, and is configured such that refrigerant circulates in a closed refrigerant circuit. R410A refrigerant as hydrofluorocarbon (HFC) has been broadly used as the refrigerant. However, the R410A refrigerant has a great global warming potential (GWP). In a known related technique, hydrofluoroolefin (HFO) 1123 refrigerant and a refrigerant mixture containing the HFO1123 refrigerant are used as refrigerant having a relatively-small GWP Note that the technique of this area is disclosed in WO 2012/157764 A, for example.

SUMMARY

A heat exchanger includes: a heat transfer pipe in which refrigerant flows; and a spiral groove formed at an inner peripheral surface of the heat transfer pipe. A height of an inner wall of the groove in a radial direction of the heat transfer pipe is equal to or greater than 0.1 [mm], and when a wetted edge length of the heat transfer pipe is S, an inclination angle between a pipe axis direction of the heat transfer pipe and a longitudinal direction of the groove in a section of the heat transfer pipe parallel with the pipe axis direction is θ, and a length of the heat transfer pipe is L, the inclination angle θ is an acute angle, and a wetted area S×L/cos θ of the heat transfer pipe satisfies S×L/cos θ≥0.5 [m2].

DESCRIPTION OF THE EMBODIMENTS

Figure 1:
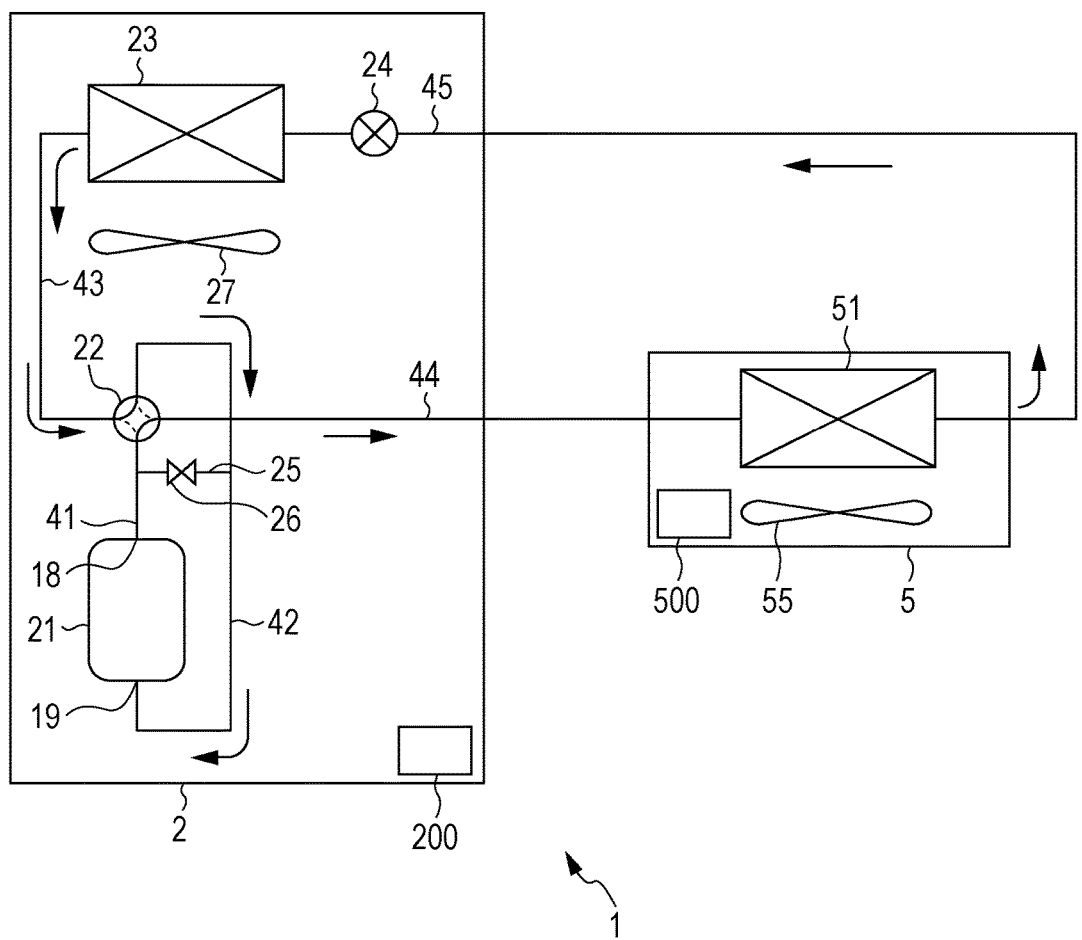
FIG. 1 illustrates a refrigerant circuit of a refrigeration cycle device of an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, the HFO1123 refrigerant has such properties that disproportional reaction represented by the following chemical reaction formula is caused under predetermined conditions.

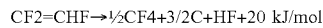

The disproportional reaction is, for example, caused when a temperature or a pressure increases with a high density of HFO1123 refrigerant or when some kind of strong energy is applied to the HFO1123 refrigerant. When the disproportional reaction is caused in the HFO1123 refrigerant, great heat is generated due to such reaction. For this reason, in a case where the disproportional reaction is caused, there is a probability that operation reliability of the refrigeration cycle device including the compressor lowers and that a pipe in the refrigeration cycle device is damaged due to a rapid pressure increase.

The molecular structure of the HFO1123 refrigerant includes a double bond. Thus, the HFO1123 refrigerant is decomposed due to reaction with air remaining in the refrigeration cycle device and a slight amount of moisture contained in the air, and as a result, sludge is easily caused. Such sludge adheres to the decompressor, a strainer, etc. in the refrigeration cycle device, leading to the probability that the sludge closes the refrigerant circuit in which the refrigerant flows. In a case where the refrigerant circuit is closed by the sludge, the refrigerant having flowed from an upstream side of a closed portion has nowhere to flow, and therefore, the pressure and temperature of refrigerant increase. Such a pressure and temperature increase might lead to the disproportional reaction of the HFO1123 refrigerant.

One object of the technique of the present disclosure is to provide a heat exchanger and a refrigeration cycle device configured so that closing of a decompressor, a strainer, etc. of a refrigeration cycle device by sludge can be reduced.

A heat exchanger according to an aspect of the present application includes: a heat transfer pipe in which refrigerant flows, and a spiral groove formed at an inner peripheral surface of the heat transfer pipe. A height of an inner wall of the groove in a radial direction of the heat transfer pipe is equal to or greater than 0.1 [mm], and when a wetted edge length of the heat transfer pipe is S, an inclination angle between a pipe axis direction of the heat transfer pipe and a longitudinal direction of the groove in a section of the heat transfer pipe parallel with the pipe axis direction is θ, and a length of the heat transfer pipe is L, the inclination angle θ is an acute angle, and a wetted area S×L/cos θ of the heat transfer pipe satisfies S×L/cos θ≥0.5 [m2].

By application of the above-described heat exchanger to the refrigeration cycle device, closing of the decompressor etc. of the refrigeration cycle device by the sludge can be reduced.

Hereinafter, an embodiment of a heat exchanger disclosed in the present application will be described in detail with reference to the drawings. Note that the following embodiment is not intended to limit the heat exchanger disclosed in the present application.

[Configuration of Refrigeration Cycle Device]

FIG. 1 illustrates a refrigerant circuit of a refrigeration cycle device of the present embodiment. The refrigeration cycle device 1 is applied to an air conditioner configured to perform cooling/heating in a room. As illustrated in FIG. 1, the refrigeration cycle device 1 includes an outdoor unit 2 and an indoor unit 5. The outdoor unit 2 includes a rotary compressor 21, a four-way valve 22, an outdoor heat exchanger 23, a throttle device (a decompressor) 24, a bypass line 25, a bypass valve 26, and an outdoor-unit controller 200.

The rotary compressor 21 includes a discharge opening 18 as a discharge section, and an intake opening 19 as an intake section. The rotary compressor 21 is controlled by the outdoor-unit controller 200 such that refrigerant supplied from the intake opening 19 through the four-way valve 22 and an intake pipe 42 is compressed and that the compressed refrigerant is supplied from the discharge opening 18 to the four-way valve 22 through a discharge pipe 41. HFO1123 refrigerant or a refrigerant mixture containing the HFO1123 refrigerant is used as the refrigerant.

The four-way valve 22 is connected to the discharge pipe 41 and the intake pipe 42. Further, the four-way valve 22 is connected to the outdoor heat exchanger 23 via a refrigerant pipe 43, and is connected to the indoor unit 5 via a refrigerant pipe 44. The indoor unit 5 and the outdoor heat exchanger 23 are connected together via a refrigerant pipe 45. The outdoor-unit controller 200 controls the four-way valve 22 to set the four-way valve 22 to either one of a heating mode or a cooling mode. With setting of the four-way valve 22 to the heating mode, an operation mode of the refrigeration cycle device 1 is set to a heating operation mode. With setting of the four-way valve 22 to the cooling mode, the operation mode of the refrigeration cycle device 1 is, on the other hand, set to a cooling operation mode.

When being set to the cooling mode, the four-way valve 22 supplies the outdoor heat exchanger 23 with the refrigerant discharged from the rotary compressor 21 through the discharge pipe 41. Further, the four-way valve 22 supplies, through the intake pipe 42, the rotary compressor 21 with the refrigerant having flowed out of the indoor unit 5. When being set to the heating mode, the four-way valve 22 supplies the indoor unit 5 with the refrigerant discharged from the rotary compressor 21 through the discharge pipe 41. Further, the four-way valve 22 supplies, through the intake pipe 42, the rotary compressor 21 with the refrigerant having flowed out of the outdoor heat exchanger 23.

The outdoor heat exchanger 23 is connected to the throttle device 24 via the refrigerant pipe 45. An outdoor fan 27 is disposed in the vicinity of the outdoor heat exchanger 23. The outdoor fan 27 is rotated by a fan motor (not shown), thereby taking ambient air in the outdoor unit 2. After heat exchange between the ambient air and the refrigerant by the outdoor heat exchanger 23, the outdoor fan 27 releases such ambient air to the outside of the outdoor unit 2. In the case of the cooling operation mode, the outdoor heat exchanger 23 performs heat exchange between the refrigerant supplied from the four-way valve 22 and the ambient air taken into the outdoor unit 2, and then, supplies the throttle device 24 with the refrigerant subjected to heat exchange. In the heating operation mode, the outdoor heat exchanger 23 performs heat exchange between the refrigerant supplied from the throttle device 24 and the ambient air taken into the outdoor unit 2, and then, supplies the four-way valve 22 with the refrigerant subjected to heat exchange.

The throttle device 24 is connected to the indoor unit 5 via the refrigerant pipe 45. In the case of the cooling operation mode, the throttle device 24 decompresses, by adiabatic expansion, the refrigerant supplied from the outdoor heat exchanger 23. The throttle device 24 supplies the indoor unit 5 with the two-phase refrigerant having reached a lower temperature and a lower pressure by adiabatic expansion. In the case of the heating operation mode, the throttle device 24 decompresses, by adiabatic expansion, the refrigerant supplied from the indoor unit 5. The throttle device 24 supplies the outdoor heat exchanger 23 with the two-phase refrigerant having reached a lower temperature and a lower pressure by adiabatic expansion. Further, the opening degree of the throttle device 24 is adjusted by control by the outdoor-unit controller 200. In the case of the heating operation mode, the outdoor-unit controller 200 adjusts the opening degree of the throttle device 24 to adjust the flow rate of the refrigerant supplied from the indoor unit 5 to the outdoor heat exchanger 23. In the case of the cooling operation mode, the outdoor-unit controller 200 adjusts the opening degree of the throttle device 24 to adjust the flow rate of the refrigerant supplied from the outdoor heat exchanger 23 to the indoor unit 5.

The bypass line 25 connects the discharge pipe 41 and the intake pipe 42 together. The bypass valve 26 is provided in the middle of the bypass line 25. The bypass valve 26 is controlled by the outdoor-unit controller 200, thereby supplying the refrigerant from the discharge pipe 41 to the intake pipe 42 through the bypass line 25 or stopping a refrigerant supply from the discharge pipe 41 to the intake pipe 42.

The indoor unit 5 has an indoor heat exchanger 51, an indoor fan 55, and an indoor-unit controller 500. The indoor fan 55 is arranged in the vicinity of the indoor heat exchanger 51. The indoor fan 55 is rotated by a fan motor (not shown), thereby taking indoor air in the indoor unit 5. After heat exchange between the indoor air and the refrigerant by the indoor heat exchanger 51, the indoor fan 55 releases such indoor air to the inside of the room. The indoor heat exchanger 51 is connected to the four-way valve 22 of the outdoor unit 2 via the refrigerant pipe 44, and is connected to the throttle device 24 of the outdoor unit 2 via the refrigerant pipe 45. When the operation mode of the refrigeration cycle device 1 is set to the cooling operation mode, the indoor heat exchanger 51 functions as an evaporator. On the other hand, when the operation mode of the refrigeration cycle device 1 is set to the heating operation mode, the indoor heat exchanger 51 functions as a condenser. That is, in the case of the cooling operation mode, the indoor heat exchanger 51 performs heat exchange between the low-temperature low-pressure two-phase refrigerant supplied from the throttle device 24 and the indoor air taken into the indoor unit 5. After heat exchange, the indoor heat exchanger 51 releases such indoor air to the inside of the room, and supplies such refrigerant to the four-way valve 22. In the case of the heating operation mode, the indoor heat exchanger 51 performs heat exchange between the refrigerant supplied from the four-way valve 22 and the indoor air taken into the indoor unit 5. After heat exchange, the indoor heat exchanger 51 releases such indoor air to the inside of the room, and supplies such refrigerant to the throttle device 24.

[Configuration of Outdoor-Unit Controller]

The outdoor-unit controller 200 includes a so-called microcomputer, and has a not-shown central processing unit (CPU), a not-shown storage device, and a not-shown input/output device. The CPU executes a computer program installed in the outdoor-unit controller 200, thereby controlling the storage device and the input/output device. Further, the CPU controls each of the rotary compressor 21, the four-way valve 22, the throttle device 24, the bypass valve 26, and the indoor-unit controller 500. The storage device records the computer program. The storage device records information to be utilized by the CPU. The computer program installed in the outdoor-unit controller 200 includes multiple computer programs for causing the outdoor-unit controller 200 to implement each of multiple functions.

As described above, the refrigeration cycle device 1 of the present embodiment is configured as a single-type device having a single outdoor unit 2 and a single indoor unit 5 corresponding to the outdoor unit 2. Instead of such a configuration, the refrigeration cycle device 1 of the present embodiment may be configured as a multi-type device having a single outdoor unit 2 and multiple indoor units 5 corresponding to the outdoor unit 2. Moreover, the heat exchanger of the present embodiment is applied to the refrigeration cycle device 1 using the rotary compressor 21. However, the refrigeration cycle device to which the heat exchanger of the present embodiment is applied is not limited to the refrigeration cycle device 1 using the rotary compressor 21. The heat exchanger of the present embodiment may be applied to a refrigeration cycle device using a scroll compressor.

[Configuration of Heat Exchanger]

Figure 2:
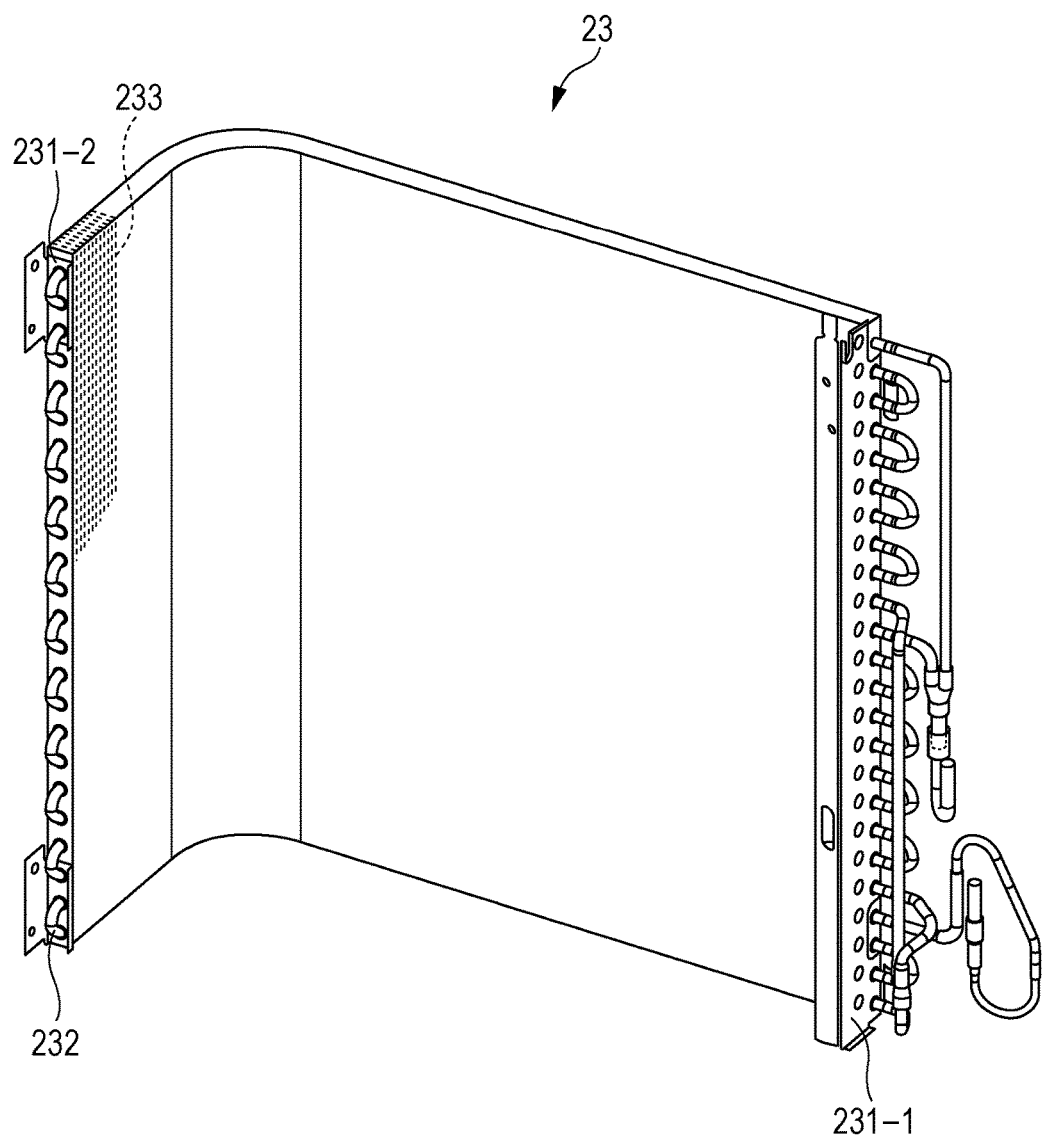
FIG. 2 is a perspective view of an outdoor heat exchanger of the embodiment.

FIG. 2 is a perspective view of the outdoor heat exchanger 23 of the present embodiment. The heat exchanger of the present embodiment is provided as the outdoor heat exchanger 23 and the indoor heat exchanger 51 at the refrigeration cycle device 1. As illustrated in FIG. 2, the outdoor heat exchanger 23 has a pair of side plates 231-1, 231-2, a heat transfer pipe 232, and multiple fins 233. The side plates 231-1, 231-2 are each formed in a plate shape. The side plates 231-1, 231-2 are each arranged along both ends in a stacking direction of the multiple fins 233, and are supported by the outdoor unit 2. The side plates 231-1, 231-2 are provided with multiple through-holes.

Note that FIG. 2 illustrates an example of the shape of the heat exchanger in the case of applying the heat exchanger as the outdoor heat exchanger 23. However, the shape of the heat exchanger of the present embodiment is not limited to the shape illustrated in FIG. 2. For example, in a case where the heat exchanger of the present embodiment is applied to the indoor heat exchanger 51, the heat exchanger of the present embodiment is formed to have a shape in accordance with the form of the indoor unit 5.

The heat transfer pipe 232 is formed as a single circular pipe. The heat transfer pipe 232 meanders between the side plates 231-1, 231-2. The heat transfer pipe 232 includes multiple linear portions and multiple bent portions. Adjacent two of the multiple linear portions are connected to each of the multiple bent portions. The heat transfer pipe 232 is supported by each of the side plates 231-1, 231-2 in such a manner that the multiple linear portions are each inserted into the multiple through-holes formed at the side plates 231-1, 231-2. One end of the heat transfer pipe 232 is connected to the four-way valve 22 via the refrigerant pipe 43. The other end of the heat transfer pipe 232 is connected to the throttle device 24 via the refrigerant pipe 45.

[Characteristic Configuration of Heat Exchanger]

In the refrigeration cycle device 1, a slight amount of air and/or moisture enters the refrigerant pipes 43, 44, 45, etc. upon manufacturing and mounting of the refrigerant circuit. A greater inner pipe volume of the refrigerant circuit results in a greater amount of entering air and/or moisture. In the refrigeration cycle device 1, a portion with the greatest inner pipe volume is the outdoor heat exchanger 23. The HFO1123 refrigerant is hydrolyzed by the entering air and/or moisture, and causes the sludge. The sludge sometimes closes the throttle device 24. Moreover, in the case of providing a strainer at the refrigerant circuit of the refrigeration cycle device 1, clogging and closing of the strainer might be caused due to the sludge. In the refrigeration cycle device 1, the refrigerant is accumulated upstream of the closed throttle device 24 or strainer due to closing of the throttle device 24 or the strainer. The refrigerant pressure increases, and accordingly, the refrigerant temperature also increases. In the refrigeration cycle device 1, disproportional reaction of the HFO1123 refrigerant might be caused due to an increase in the refrigerant temperature and pressure in the refrigerant circuit. In a case where the disproportional reaction of the HFO1123 refrigerant is caused, a rapid temperature and pressure increase is caused in the refrigerant circuit. As a result, inconvenience such as damage of the pipe of the refrigeration cycle device 1 might be caused.

For this reason, in the present embodiment, the heat transfer pipe provided at the heat exchanger has a characteristic inner shape. With this inner shape, the sludge easily caused upon use of the HFO1123 refrigerant as the refrigerant is specifically trapped. Note that in the present embodiment, the heat transfer pipe having the above-described characteristic inner shape is applied to both of the outdoor heat exchanger 23 and the indoor heat exchanger 51. Instead, this heat transfer pipe may be, as necessary, applied to only either one of the outdoor heat exchanger 23 or the indoor heat exchanger 51.

Figure 3:
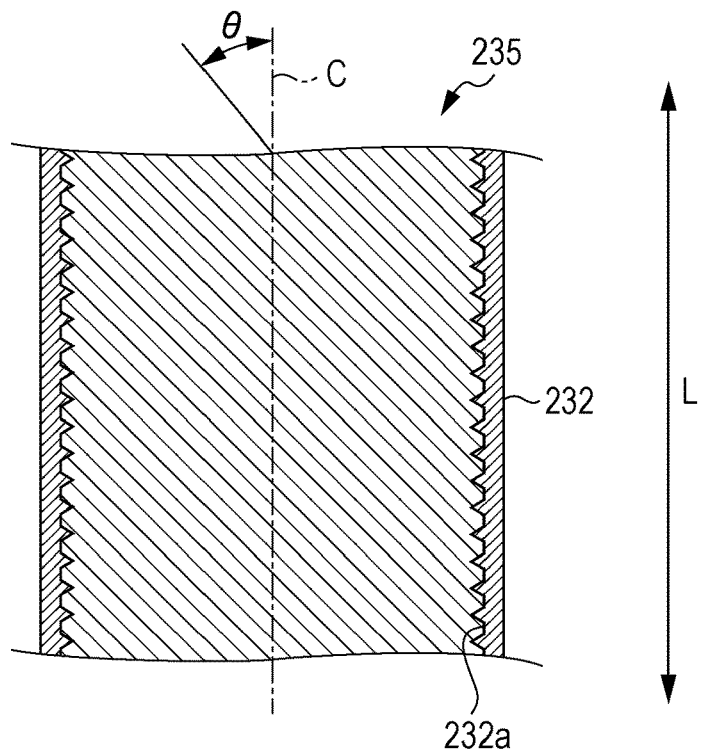
FIG. 3 is a longitudinal sectional view of a heat transfer pipe provided at the outdoor heat exchanger of the embodiment.
Figure 4:
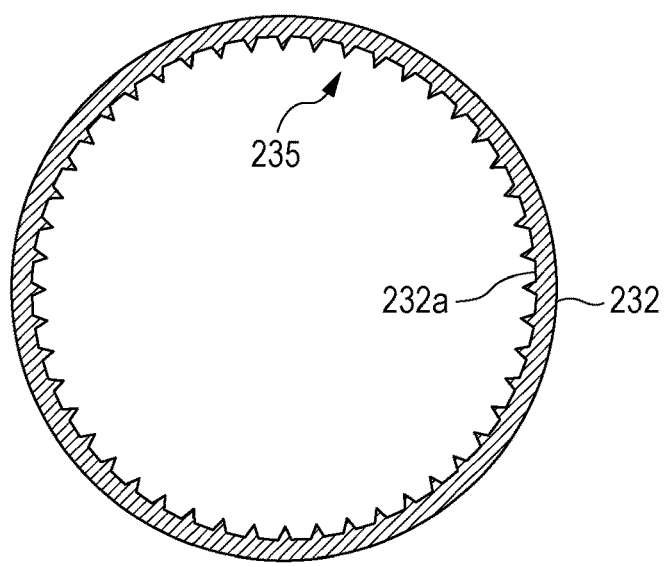
FIG. 4 is a cross-sectional view of the heat transfer pipe provided at the outdoor heat exchanger of the embodiment.
Figure 5:
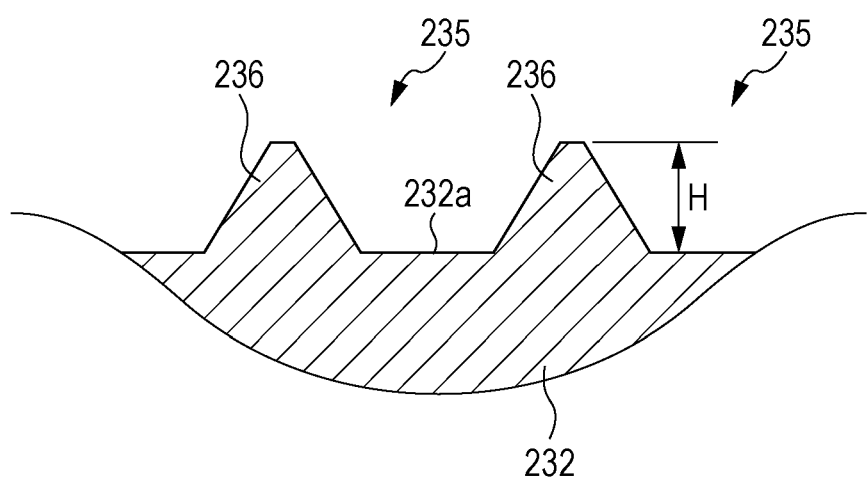
FIG. 5 is an enlarged sectional view of a groove at an inner peripheral surface of the heat transfer pipe of the embodiment.

FIG. 3 is a longitudinal sectional view of the heat transfer pipe provided at the outdoor heat exchanger 23 in the present embodiment. FIG. 4 is a cross-sectional view of the heat transfer pipe provided at the outdoor heat exchanger 23 in the present embodiment. FIG. 5 is an enlarged sectional view of a groove at an inner peripheral surface of the heat transfer pipe of the present embodiment.

As illustrated in FIG. 3, a spiral groove 235 is formed about a pipe axis C at an inner peripheral surface 232a of the heat transfer pipe 232. The groove 235 traps the sludge flowing together with the refrigerant. A longitudinal direction of the groove 235 is inclined with respect to a pipe axis C direction. When an inclination angle between the pipe axis C direction and the longitudinal direction of the groove 235 in a section of the heat transfer pipe 232 parallel with the pipe axis C direction of the heat transfer pipe 232 is θ, the inclination angle θ is an acute angle. The groove 235 is formed as follows, for example. For example, a plug having a groove is inserted into the heat transfer pipe 232. In this state, the heat transfer pipe 232 is pressed from an outer peripheral side thereof. In this manner, the groove 235 is formed at the inner peripheral surface 232a.

As illustrated in FIGS. 4 and 5, the heat transfer pipe 232 is formed such that the height (the depth of the groove 235) H of an inner wall 236 of the groove 235 in a radial direction of the heat transfer pipe 232 is equal to or greater than 0.1 [mm]. The wetted area of the inner peripheral surface 232a of the heat transfer pipe 232 is represented by S×L/cos θ where the wetted edge length of the heat transfer pipe 232 is S and the length of a flow passage of the heat transfer pipe 232 is L. The heat transfer pipe 232 is formed such that the wetted area S×L/cos θ satisfies the following first expression:

$$S \times L / \cos \theta \geq 0.5 \ [m^2]$$ First Expression

Note that the heat transfer pipe 232 is expanded to a desired outer diameter at the step of manufacturing the heat transfer pipe 232. The above-described first expression represents the dimensions of the heat transfer pipe 232 after pipe expansion (diameter expansion).

Advantageous effects when the heat transfer pipe 232 having the groove 235 satisfies the above-described first expression will be described. Suppose that the height H of the inner wall 236 of the groove 235 of the heat transfer pipe 232 is 0.1 [mm]. Considering the thickness of the sludge accumulated in the groove 235, it can be said that in this case, there is almost no influence of the sludge on heat transfer performance of the heat transfer pipe 232 and a pressure loss of the heat transfer pipe 232 in association with refrigerant flow resistance when a ratio between the thickness of the sludge and the height H of the inner wall 236 of the groove 235 is equal to or less than 1/1000.

Moreover, it has been confirmed from an experimental result that when a sludge of 0.05 [cc] adheres to the inside of the throttle device 24, the discharge temperature of the refrigerant discharged from the rotary compressor 21 increases by 10 [deg] in association with an increase in the refrigerant flow resistance. The HFO1123 refrigerant more easily causes the disproportional reaction as the discharge temperature increases. For this reason, in the present embodiment, a proper groove 235 is, for suppressing a refrigerant temperature increase, formed on the basis of reduction in the refrigerant flow resistance even in a case where a sludge of 0.05 [cc] adheres to the inside of the throttle device 24.

That is, the surface area of the inner peripheral surface 232a of the heat transfer pipe 232 is set such that lowering of the heat transfer performance of the heat transfer pipe 232 is suppressed and that the refrigerant flow resistance and the pressure loss due to the sludge are reduced even in a case where a sludge of 0.05 [cc] adheres to the heat transfer pipe 232. Thus, in a case where the height H of the inner wall 236 of the groove 235 is 0.1 [mm] and a sludge of 0.05 [cc] is accumulated in the heat transfer pipe 232, the wetted area (S×L/cos θ) of the heat transfer pipe 232 is set greater than 0.05 [cc]/0.0001 [mm] such that the thickness of the sludge accumulated in the groove 235 is equal to or less than 0.1 [mm]×1/1000=0.0001 [mm]. Note that the wetted area (S×L/cos θ) of the heat transfer pipe 232 is the surface area of a sludge trapping portion of the inner peripheral surface 232a of the heat transfer pipe 232.

That is, the wetted area (S×L/cos θ) of the heat transfer pipe 232 satisfies the following expression:

$$S \times L/\cos \theta \geq 0.05 \text{ [cc]}/0.0001 \text{ [mm]} = (0.05 \text{ m}^3 \times 10^{-6})/(0.1 \text{ [m]} \times 10^{-6}) = 0.5 \text{ [m}^2\text{]}$$

The groove 235 of the heat transfer pipe 232 is formed to satisfy the wetted area (S×L/cos θ) of the heat transfer pipe 232≥0.5 [m²], and therefore, there is almost no influence of the sludge accumulated in the groove 235 on the heat transfer performance of the heat transfer pipe 232 and the pressure loss of the heat transfer pipe 232 in association with the refrigerant flow resistance. Moreover, in the case of using the HFO1123 refrigerant, even when a sludge of 0.05 [cc] adheres to the inside of the heat transfer pipe 232, the flow resistance of the HFO1123 refrigerant is reduced, and therefore, the disproportional reaction of the HFO1123 refrigerant is reduced.

An example of the dimensions of the heat transfer pipe 232 of each of the outdoor unit 2 and the indoor unit 5 in the case of using the rotary compressor 21 having a cooling output of 4.0 [kW] will be described herein, for example. In the outdoor heat exchanger 23 of the outdoor unit 2, the heat transfer pipe 232 having an outer diameter of 7 [mm] is used, for example. This heat transfer pipe 232 is formed such that the wetted edge length S of the heat transfer pipe 232 is 0.0357 [m], that the length L of the flow passage of the heat transfer pipe 232 is 63.0 [m], and that the inclination angle θ of the groove 235 is 30 degrees. Thus, the first expression is satisfied.

In the indoor heat exchanger 51 of the indoor unit 5, the heat transfer pipe 232 having an outer diameter of 5 [mm] and the heat transfer pipe 232 having an outer diameter of 7 [mm] are used in combination, for example. The heat transfer pipe 232 having an outer diameter of 5 [mm] is formed such that the wetted edge length S of the heat transfer pipe 232 is 0.0257 [m], that the length L of the flow passage of the heat transfer pipe 232 is 50.4 [m], and that the inclination angle θ of the groove 235 is 18 degrees. Thus, the first expression is satisfied. The heat transfer pipe 232 having an outer diameter of 7 [mm] is formed such that the wetted edge length S of the heat transfer pipe 232 is 0.0357 [m], that the length L of the flow passage of the heat transfer pipe 232 is 6.07 [m], and that the inclination angle θ of the groove 235 is 30 degrees. Thus, the first expression is satisfied.

Moreover, in the outdoor unit 2 and the indoor unit 5 of the present embodiment, the mass velocity of the refrigerant is set to such a value that the groove 235 of the heat transfer pipe 232 easily traps the sludge upon operation of the rotary compressor 21.

In the outdoor heat exchanger 23 of the outdoor unit 2, the mass velocity of the refrigerant in the heat transfer pipe 232 in the case of using the outdoor heat exchanger 23 as the condenser satisfies a range of equal to or greater than 50 [kg/(s·m²)] and equal to or less than 150 [kg/(s·m²)]. In the outdoor heat exchanger 23, it is not preferable that the mass velocity of the refrigerant is less than 50 [kg/(s·m²)] because the sludge flows out of the groove without being accumulated in the groove 235. Moreover, in the outdoor heat exchanger 23, it is not preferable that the mass velocity of the refrigerant exceeds 150 [kg/(s·m²)] because the sludge trapped in the groove 235 is swept away by the flow of refrigerant. For this reason, the mass velocity of the refrigerant satisfies the above-described range so that the refrigerant flow resistance on the groove 235 can be properly ensured. Thus, the effect of trapping the sludge by the groove 235 can be enhanced.

In the indoor heat exchanger 51 of the indoor unit 5, the mass velocity of the refrigerant in the heat transfer pipe 232 in the case of using the outdoor heat exchanger 23 as the evaporator satisfies a range of equal to or greater than 100 [kg/(s·m²)] and equal to or less than 200 [kg/(s·m²)]. As described above, in the indoor heat exchanger 51, it is not preferable that the mass velocity of the refrigerant is less than 100 [kg/(s·m²)] because the sludge flows out of the groove without being accumulated in the groove 235. Moreover, in the indoor heat exchanger 51, it is not preferable that the mass velocity of the refrigerant exceeds 200 [kg/(s·m²)] because the sludge trapped in the groove 235 is swept away by the flow of refrigerant. For this reason, the mass velocity of the refrigerant satisfies the above-described range so that the refrigerant flow resistance on the groove 235 can be properly ensured. Thus, the effect of trapping the sludge by the groove 235 can be enhanced.

According to the heat transfer pipe 232 configured as described above, the sludge flowing together with the refrigerant in the refrigerant circuit of the refrigeration cycle device 1 can be trapped in the groove 235 of the heat transfer pipe 232. With this configuration, accumulation of the sludge in the throttle device (the decompressor) 24 and the strainer (not shown) arranged on the refrigerant circuit is reduced. As a result, closing of the flow passage of the throttle device 24 etc. by the sludge is reduced. Note that although not shown in the figure, an inner surface of the groove 235 may be subjected to the surface processing of increasing a surface roughness for enhancing sludge trapping capacity of the inner peripheral surface 232a of the heat transfer pipe 232, i.e., the inner surface of the groove 235, for example.

The multiple fins 233 are each formed of metal plates thinner than the side plates 231-1, 231-2. The multiple fins 233 are each arranged parallel with the side plates 231-1, 231-2 between the side plates 231-1, 231-2. Each of the multiple fins 233 is provided with multiple through-holes. The multiple linear portions of the heat transfer pipe 232 are each inserted into the multiple through-holes. Further, each of the multiple fins 233 is joined to the multiple linear portions of the heat transfer pipe 232. With this configuration, each fin 233 is supported by the outdoor unit 2 via the heat transfer pipe 232, and is thermally connected to the heat transfer pipe 232.

The outdoor heat exchanger 23 causes the ambient air taken into the outdoor unit 2 to contact the heat transfer pipe 232 and the multiple fins 233. With this configuration, the outdoor heat exchanger 23 performs, via the heat transfer pipe 232 and the multiple fins 233, heat exchange between the ambient air and the refrigerant flowing in the heat transfer pipe 232. That is, when the refrigerant flowing in the heat transfer pipe 232 has a higher temperature than that of the ambient air taken into the outdoor unit 2, the outdoor heat exchanger 23 cools the refrigerant and heats the ambient air. When the refrigerant flowing in the heat transfer pipe 232 has a lower temperature than that of the ambient air taken into the outdoor unit 2, the outdoor heat exchanger 23 heats the refrigerant and cools the ambient air.

The indoor heat exchanger 51 is formed similarly to the outdoor heat exchanger 23. The indoor heat exchanger 51 causes the indoor air taken into the indoor unit 5 to contact the heat transfer pipe 232 and the multiple fins 233. With this configuration, the indoor heat exchanger 51 performs, via the heat transfer pipe 232 and the multiple fins 233, heat exchange between the indoor air and the refrigerant flowing in the heat transfer pipe 232. That is, when the refrigerant flowing in the heat transfer pipe 232 has a higher temperature than that of the indoor air taken into the indoor unit 5, the indoor heat exchanger 51 cools the refrigerant and heats the indoor air. When the refrigerant flowing in the heat transfer pipe 232 has a lower temperature than that of the indoor air taken into the indoor unit 5, the indoor heat exchanger 51 heats the refrigerant and cools the indoor air.

[Operation of Refrigeration Cycle Device]

For adjusting the inner temperature of the room where the indoor unit 5 is arranged, a user of the refrigeration cycle device 1 operates a remote controller (not shown) to start the refrigeration cycle device 1 and to input operation conditions to the indoor-unit controller 500. When the operation conditions are input, the indoor-unit controller 500 transmits the input operation conditions, the temperature of the indoor heat exchanger 51, and the indoor temperature to the outdoor-unit controller 200. Based on the operation conditions, the temperature of the indoor heat exchanger 51, and the indoor temperature received from the indoor-unit controller 500), the outdoor-unit controller 200 executes either one of heating operation or cooling operation. In FIG. 1, the flow of the refrigerant in the refrigerant circuit in the heating operation is indicated by arrows.

[Cooling Operation]

In the case of performing the cooling operation, the outdoor-unit controller 200 controls the four-way valve 22 to set the four-way valve 22 to the cooling mode. In this case, the rotary compressor 21 controlled by the outdoor-unit controller 200 compresses the gas refrigerant sucked from the four-way valve 22 through the intake pipe 42. The rotary compressor 21 discharges the compressed high-temperature high-pressure gas refrigerant to the four-way valve 22. When being set to the cooling mode, the four-way valve 22 supplies the outdoor heat exchanger 23 with the high-temperature high-pressure gas refrigerant discharged from the rotary compressor 21. The outdoor heat exchanger 23 performs heat exchange between the ambient air taken into the outdoor unit 2 and the high-temperature high-pressure gas refrigerant. In this manner, the outdoor heat exchanger 23 condenses and liquefies the high-temperature high-pressure gas refrigerant. The outdoor heat exchanger 23 supplies such high-pressure liquid refrigerant to the throttle device 24.

The throttle device 24 performs adiabatic expansion for the high-pressure liquid refrigerant supplied from the outdoor heat exchanger 23, thereby converting such refrigerant into low-temperature low-pressure two-phase refrigerant. The throttle device 24 supplies the low-temperature low-pressure two-phase refrigerant to the indoor heat exchanger 51 of the indoor unit 5. The indoor heat exchanger 51 performs heat exchange between the low-temperature low-pressure two-phase refrigerant supplied from the throttle device 24 and the indoor air taken into the indoor unit 5. In this manner, the indoor heat exchanger 51 evaporates and gasifies the low-temperature low-pressure two-phase refrigerant. The indoor heat exchanger 51 supplies the low-pressure gas refrigerant to the four-way valve 22. When being set to the cooling mode, the four-way valve 22 supplies the rotary compressor 21 with the low-pressure gas refrigerant having flowed out of the indoor heat exchanger 51.

[Heating Operation]

In the case of performing the heating operation, the outdoor-unit controller 200 controls the four-way valve 22 to set the four-way valve 22 to the heating mode. In this case, the rotary compressor 21 controlled by the outdoor-unit controller 200 compresses the gas refrigerant sucked from the four-way valve 22 through the intake pipe 42. The rotary compressor 21 discharges the compressed high-temperature high-pressure gas refrigerant to the four-way valve 22. When being set to the heating mode, the four-way valve 22 supplies the indoor unit 5 with the high-temperature high-pressure gas refrigerant discharged from the rotary compressor 21. The indoor heat exchanger 51 of the indoor unit 5 performs heat exchange between the high-temperature high-pressure gas refrigerant supplied from the four-way valve 22 to the indoor unit 5 and the indoor air taken into the indoor unit 5. In this manner, the indoor heat exchanger 51 condenses and liquefies the high-temperature high-pressure gas refrigerant. The indoor heat exchanger 51 supplies such high-pressure liquid refrigerant to the throttle device 24.

The throttle device 24 performs adiabatic expansion for the high-pressure liquid refrigerant supplied from the indoor heat exchanger 51, thereby converting such refrigerant into low-temperature low-pressure two-phase refrigerant. The throttle device 24 supplies the low-temperature low-pressure two-phase refrigerant to the outdoor heat exchanger 23. The outdoor heat exchanger 23 performs heat exchange between the ambient air taken into the outdoor unit 2 and the low-temperature low-pressure two-phase refrigerant supplied from the throttle device 24. In this manner, the outdoor heat exchanger 23 evaporates and gasifies the low-temperature low-pressure refrigerant. The outdoor heat exchanger 23 supplies the low-pressure gas refrigerant to the four-way valve 22. When being set to the heating mode, the four-way valve 22 supplies the rotary compressor 21 with the low-pressure gas refrigerant having flowed out of the outdoor heat exchanger 23.

Further, when executing the heating operation or the cooling operation, the outdoor-unit controller 200 adjusts the opening degree of the throttle device 24 based on the operation conditions, the temperature of the indoor heat exchanger 51, and the indoor temperature received from the indoor-unit controller 500. For example, in a case where the outdoor unit 2 and the indoor unit 5 are in operation, when it is, based on the operation conditions, the temperature of the indoor heat exchanger 51, and the indoor temperature received from the indoor-unit controller 500, determined that the amount of the refrigerant flowing in the indoor heat exchanger 51 is small, the outdoor-unit controller 200 controls the throttle device 24 to increase the opening degree of the throttle device 24. When it is, based on the operation conditions, the temperature of the indoor heat exchanger 51, and the indoor temperature received from the indoor-unit controller 500, determined that the amount of the refrigerant flowing in the indoor heat exchanger 51 is large, the outdoor-unit controller 20X) controls the throttle device 24 to decrease the opening degree of the throttle device 24.

As described above, the outdoor heat exchanger 23 and the indoor heat exchanger 51 of the present embodiment have the heat transfer pipes 232. The spiral groove 235 is formed at the inner peripheral surface 232a of the heat transfer pipe 232. The height of the inner wall 236 of the groove 235 is equal to or greater than 0.1 [mm]. Further, when the wetted edge length of the heat transfer pipe 232 is S, the inclination angle of the groove 235 is θ (θ degrees), and the length (the length of the flow passage of the heat transfer pipe 232) of the heat transfer pipe 232 is L, the inclination angle θ is the acute angle, and the wetted area S×L/cos θ of the heat transfer pipe 232 satisfies S×L/cos θ≥0.5 [m$^2$]. With this configuration, closing of the throttle device (the decompressor) 24, the strainer, etc. of the refrigeration cycle device 1 by the sludge can be reduced. As a result, a smooth flow of the refrigerant in the refrigerant circuit is ensured so that operation reliability of the refrigeration cycle device 1 can be enhanced.

Moreover, in the case of using, as the refrigerant, the HFO1123 refrigerant easily causing the sludge or the refrigerant mixture containing the HFO1123 refrigerant, the outdoor heat exchanger 23 and the indoor heat exchanger 51 of the present embodiment can effectively trap, by the groove 235 of the heat transfer pipe 232, the sludge caused from the HFO1123 refrigerant. Thus, the disproportional reaction of the HFO1123 refrigerant can be reduced. As a result, lowering of the operation reliability of the refrigeration cycle device 1 can be suppressed, and damage of the refrigerant circuit due to the disproportional reaction can be reduced.

The flow velocity of the refrigerant in the heat transfer pipe 232 of the outdoor heat exchanger 23 in the case of using the outdoor heat exchanger 23 of the present embodiment as the condenser is equal to or greater than 50 [kg/(s·m$^2$)] and equal to or less than 150 [kg/(s·m$^2$)]. With this configuration, the refrigerant flow resistance on the groove 235 in the outdoor heat exchanger 23 is properly ensured. Thus, the effect of trapping the sludge by the groove 235 can be enhanced.

Moreover, the flow velocity of the refrigerant in the heat transfer pipe 232 of the indoor heat exchanger 51 in the case of using the indoor heat exchanger 51 of the present embodiment as the evaporator is equal to or greater than 100 [kg/(s·m$^2$)] and equal to or less than 200 [kg/(s·m$^2$)]. With this configuration, the refrigerant flow resistance on the groove 235 in the indoor heat exchanger 51 is properly ensured. Thus, the effect of trapping the sludge by the groove 235 can be enhanced.

Note that the refrigerant used in the present embodiment is not limited to the HFO1123 refrigerant or the refrigerant mixture containing the HFO1123 refrigerant. In the present embodiment, accumulation of the sludge in the throttle device 24 etc. can be also avoided even in the case of using other types of refrigerant.

The embodiment of the present disclosure may be the following first to fourth heat exchangers and the following first refrigeration cycle device.

The first heat exchanger is a heat exchanger having a heat transfer pipe in which refrigerant flows. A spiral groove is formed at an inner peripheral surface of the heat transfer pipe. The height of an inner wall of the groove in a radial direction of the heat transfer pipe is equal to or greater than 0.1 [mm]. When the wetted edge length of the heat transfer pipe is S, the inclination angle of a longitudinal direction of the groove with respect to a pipe axis direction of the heat transfer pipe in a section of the heat transfer pipe parallel with the pipe axis direction is θ degrees, and the length of the heat transfer pipe is L, the inclination angle θ is an acute angle, and the wetted area S×L/cos θ of the heat transfer pipe satisfies S×L/cos θ≥0.5 [m$^2$].

The second heat exchanger is the first heat exchanger in which the refrigerant is HFO1123 refrigerant or a refrigerant mixture containing the HFO1123 refrigerant.

The third heat exchanger is the first or second heat exchanger in which the flow velocity of the refrigerant in the heat transfer pipe in the case of using the heat exchanger as a condenser is equal to or greater than 50 [kg/(s·m$^2$)] and equal to or less than 150 [kg/(s·m$^2$)].

The fourth heat exchanger is the first or second heat exchanger in which the flow velocity of the refrigerant in the heat transfer pipe in the case of using the heat exchanger as an evaporator is equal to or greater than 100 [kg/(s·m$^2$)] and equal to or less than 200 [kg/(s·m$^2$)].

The first refrigeration cycle device includes any of the first to fourth heat exchangers.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A refrigeration cycle device comprising:
   a heat exchanger comprising:
      a heat transfer pipe in which HFO1123 refrigerant or a refrigerant mixture containing the HFO1123 refrigerant flows; and
      a spiral groove formed at an inner peripheral surface of the heat transfer pipe, wherein
      a height of an inner wall of the groove in a radial direction of the heat transfer pipe is equal to or greater than 0.1 [mm], and
      when a wetted edge length of the heat transfer pipe is S, an inclination angle between a pipe axis direction of the heat transfer pipe and a longitudinal direction of the groove in a section of the heat transfer pipe parallel with the pipe axis direction is θ, and a length of the heat transfer pipe is L, the inclination angle θ is an acute angle, and a wetted area S×L/cosθ of the heat transfer pipe satisfies $S \times L/\cos\theta \geq 0.5 [m^2]$;

a throttle device which is connected to the heat exchanger; and a controller that is configured to control the throttle device such that a flow velocity of the refrigerant in the heat transfer pipe in the case of using the heat exchanger as a condenser is equal to or greater than 50 [kg/(s·m$^2$)] and equal to or less than 150 [kg/(s·m$^2$)].

2. A refrigeration cycle device comprising:
a heat exchanger comprising:
  a heat transfer pipe in which HFO1123 refrigerant or a refrigerant mixture containing the HFO1123 refrigerant flows; and
  a spiral groove formed at an inner peripheral surface of the heat transfer pipe, wherein
    a height of an inner wall of the groove in a radial direction of the heat transfer pipe is equal to or greater than 0.1 [mm], and
    when a wetted edge length of the heat transfer pipe is S, an inclination angle between a pipe axis direction of the heat transfer pipe and a longitudinal direction of the groove in a section of the heat transfer pipe parallel with the pipe axis direction is θ, and a length of the heat transfer pipe is L, the inclination angle θ is an acute angle, and a wetted area S×L/cosθ of the heat transfer pipe satisfies $S \times L/\cos\theta \geq 0.5 [m^2]$;

a throttle device which is connected to the heat exchanger; and a controller that is configured to control the throttle device such that a flow velocity of the refrigerant in the heat transfer pipe in the case of using the heat exchanger as an evaporator is equal to or greater than 100 [kg/(s·m$^2$)] and equal to or less than 200 [kg/(s·m$^2$)].

* * * * *